INVENTORS
WALTER KÖPPEL
WILHELM OTT

INVENTORS
WALTER KÖPPEL
WILHELM OTT

INVENTORS
WALTER KÖPPEL
WILHELM OTT

United States Patent Office 2,898,895
Patented Aug. 11, 1959

2,898,895

COOLING ARRANGEMENT FOR INJECTION NOZZLES OF INTERNAL COMBUSTION ENGINES

Walter Köppel and Wilhelm Ott, Nurnberg, Germany, assignors to MAN, Maschinenfabrik Augsburg-Nurnberg, A.G., Nurnberg, Germany Application July 18, 1957, Serial No. 672,718

Claims priority, application Germany July 24, 1956

3 Claims. (Cl. 123—41.31)

The present invention relates to injection nozzles for internal combustion engines. More in particular, the present invention relates to a cooling system for injection nozzles and their nozzle holders of internal combustion engines.

It is well known that during the operation of fuel injection nozzles in internal combustion engines a considerable amount of heat is developed and the injection nozzle and particularly the nozzle holder must therefore be constantly cooled during the injection operation. The arrangement of special cooling means requires that sufficient space be left between the nozzle holders and the valves. Since it is a general aim in the construction of power engines to make engines of a given output as small as possible, valuable space is lost.

It has therefore been suggested to eliminate separate cooling means and effect the cooling of the injection nozzle by the general cooling means of the engine.

In the case of water cooled internal combustion engines it has been proposed to include the injection nozzle in the general cooling cycle of circulating water. According to these suggestions, the nozzle holder, which may or may not have a special cooling jacket, is guided through a special cooling chamber through which the cooling water circulates. This arrangement is complicated because the nozzle holder must be equipped with sealing means carefully sealing the holder against the cooling water in the cooling chamber surrounding the holder, in order to prevent water from entering into the combustion chamber of the engine. Particular care has to be taken that the combustion chamber is protected from the influx of water whenever the injection nozzle and the injection holder are removed from the engine, (e.g. for repair or replacement), in case the cooling water has not been released from the circulatory cooling system.

In the case of air cooled internal combustion engines it has been suggested to introduce the nozzle holder into the stream of air passing over the cylinder head between the flanges of the valves. This arrangement is complicated, space-consuming and necessitates a particular construction and arrangement of the cooling ribs.

It is an object of the present invention to provide for a simple and reliable cooling system for the injection nozzles and nozzle holders of internal combustion engines.

It is another object of the present invention to provide for a simple and reliable cooling system for the injection nozzles and nozzle holders of internal combustion engines which requires less space than known cooling systems.

It is still another object of the present invention to provide for a simple and reliable cooling system for the injection nozzles and nozzle holders of internal combustion engines which operates safely and does not constitute a source of danger to other parts of the engine.

These objects are achieved by the present invention, according to which the nozzle holder is guided directly through the air intake passageway of the engine. The air taken in through this passageway to be then conducted to the combustion chamber thus cools the nozzle holder while travelling through the intake passageway.

According to one embodiment of the present invention the nozzle is provided with a cooling jacket which is cast onto the wall of the air intake passage thus forming an integral body with the latter.

According to another embodiment of the present invention which is applicable to internal combustion engines having two or more intake valves with a common air-intake passageway, the nozzle holder is arranged in the plane in which the stream of air entering the air-intake passageway divides in order to reach the two or more inlet valves. In this embodiment the nozzle holder can be arranged either parallel or at any angle to the axis of the cylinder or the valves of the engine.

The invention will be more fully apprehended upon the following description of the accompanying drawings, wherein, Figure 1 is a longitudinally sectional view of a cylinder head and the upper portion of a cylinder with the valves and injection nozzle of an internal combustion engine, and shows the arrangement of the nozzle holder according to the invention;

Figure 1:
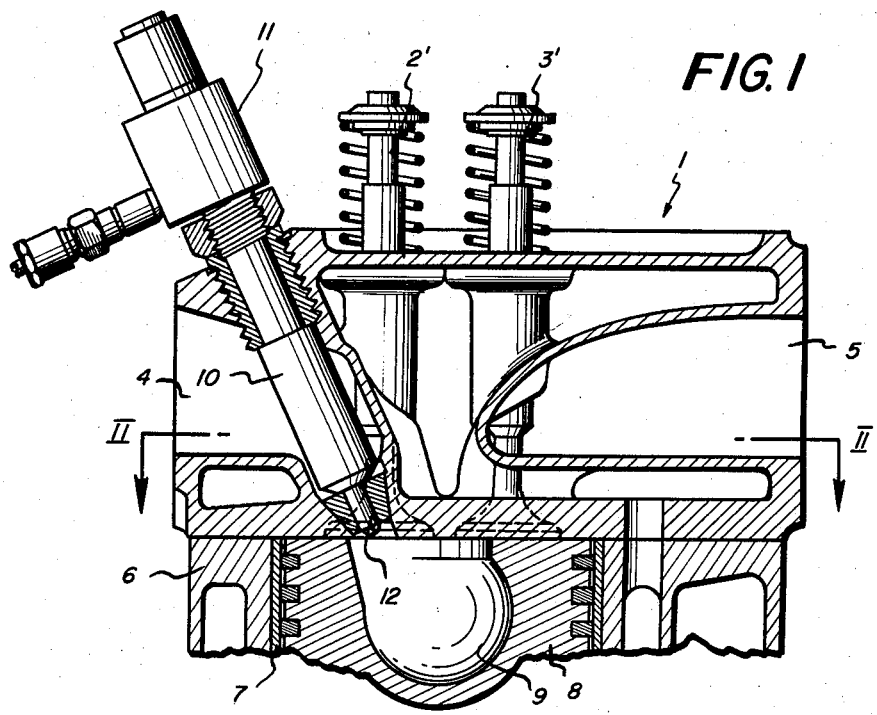
Figure 2:
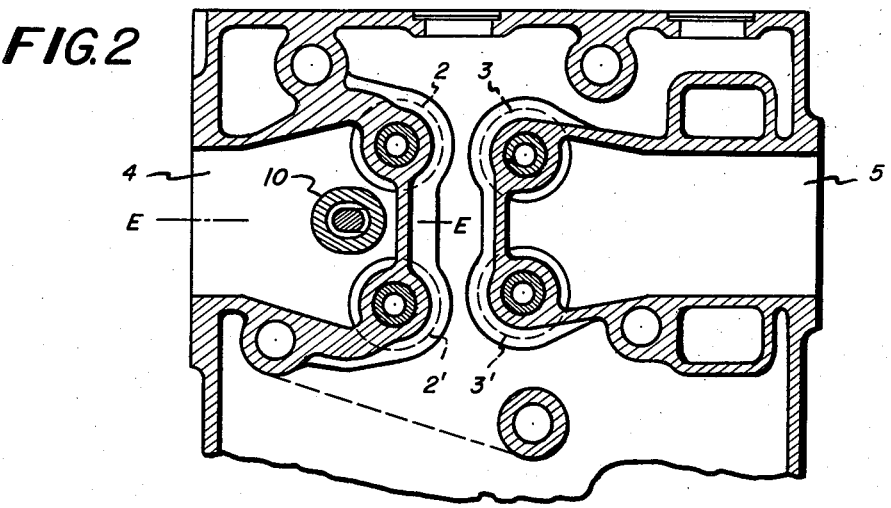
Figure 2 is a sectional view along the line II—II of the structure shown in Figure 1.

Referring now to the drawings somewhat more in detail, reference numeral 1 designates the cylinder head of a water cooled internal combustion engine having two intake valves 2, 2' and two exhaust valves 3, 3' for each cylinder, of which in Figure 1 only the intake valve 2 and the exhaust valve 3 can be seen. A common air-intake passageway 4 is associated with the intake valves 2 and 2', and a common air-exhaust passageway 5 is associated with the exhaust valves 3 and 3'. Within the cylinder 6 (shown only in portion) with the liner 7 shuttles back and forth the piston 8, within which there is provided the combustion chamber 9. The nozzle holder 10, having a head 11 and a nozzle 12 is arranged according to the invention, i.e. it is guided through the air-intake passageway 4 and thus is efficiently cooled by the air passing through the latter. Where there are two intake valves as in the embodiment shown in Figures 1 and 2 of the drawings, the nozzle holder 10 is positioned in the plane E—E extending symmetrically to the air-intake valves 2, 2' and coinciding with the plane passing through the center of the location where the stream of air travelling through the air-intake passageway divides into two branches, the first branch leading to valve 2, and the second branch leading to valve 2'.

Figure 3:
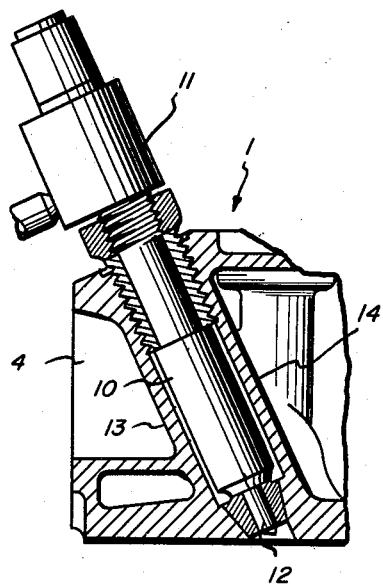
Figure 3 is a longitudinally sectional view of a portion of a cylinder and of the injection nozzle of an internal combustion engine, and shows another embodiment of the nozzle holder of the invention.
Figure 4:
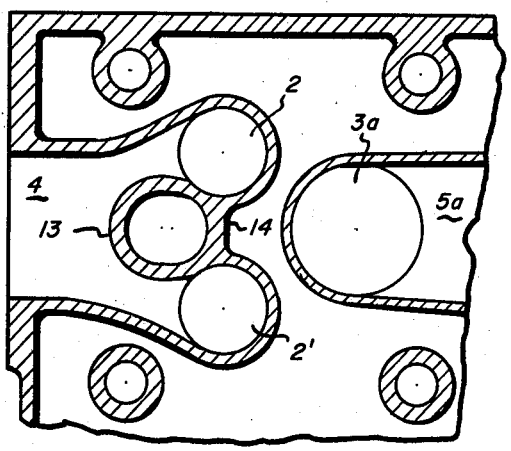
Figure 4 is a cross-sectional top view of a cylinder head of an internal combustion engine showing the embodiment of the nozzle holder and its arrangement shown in Figure 3.

According to still another embodiment of the nozzle holder of the present invention shown in Figures 3 and 4 of the accompanying drawings, there is provided a special cooling jacket 13 embracing that portion of the nozzle holder which is inserted in the cylinder head 1 of the engine. This jacket 13 is cast onto and forms an integral part with the wall 14 of the air-intake passageway 4 descending towards the intake valves 2 and 2'.

Figure 5:
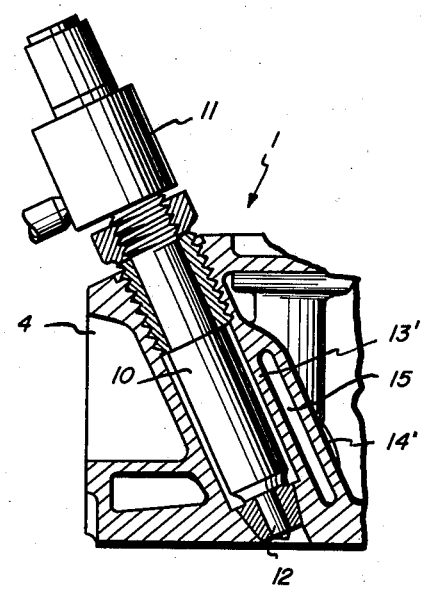
Figure 5 is a longitudinally sectional view of a portion of a cylinder and of the injection nozzle of an internal combustion engine, and shows another embodiment of the nozzle holder and its arrangement according to the invention.
Figure 6:
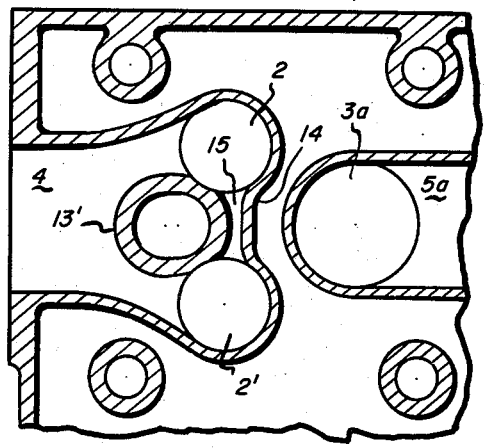
Figure 6 is a cross-sectional top view of a cylinder head of an internal combustion engine, and shows the embodiment of the nozzle holder and its arrangement shown in Figure 5.

According to still another embodiment of the present invention the nozzle holder of the invention, shown in Figures 5 and 6 of the drawings, the jacket 13' is spaced from the descending wall 14 of the air-intake passageway 4, so that a hollow space 15 is created defined by the wall 14 on the one hand, and by the jacket 13' spaced therefrom, on the other hand. The advantage of this hollow space 15 resides in the fact that the air taken in by the passageway 4 can travel within this space around the jacket 13' of the nozzle holder thus cooling the latter more intensively.

Figure 7:
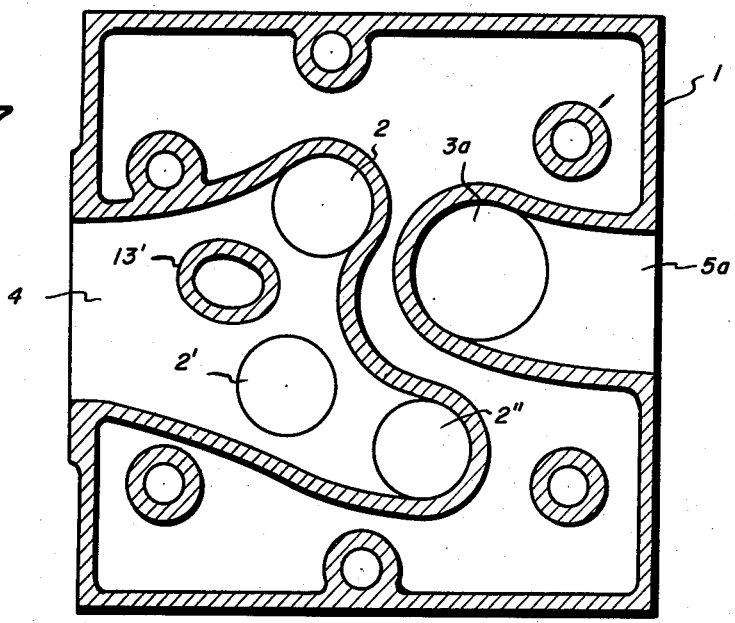
Figure 7 is a cross-sectional top view of a cylinder head of an internal combustion engine, having three intake valves and shows the nozzle holder and its arrangement according to the invention.
Figure 8:
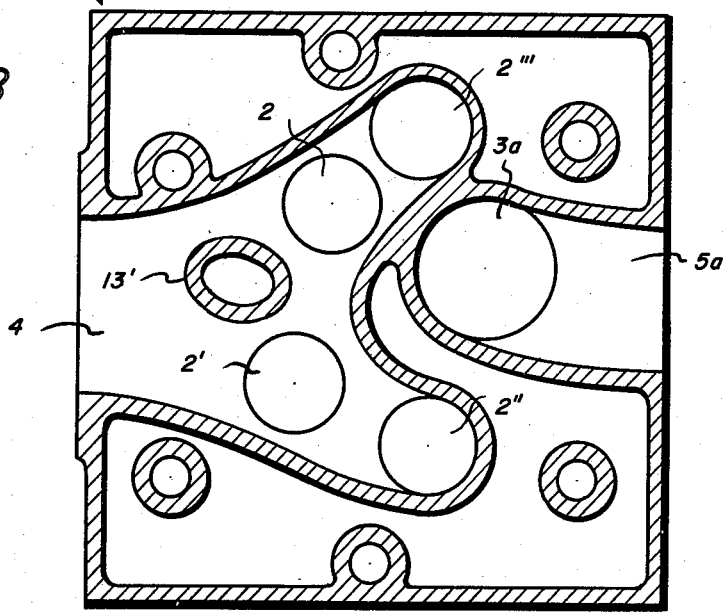
Figure 8 is a cross-sectional top view of a cylinder head of an internal combustion engine, having four intake valves and shows the nozzle holder and its arrangement according to the invention.

The invention is, of course, applicable to all internal combustion engines of the fuel injection type, irrespective of the number of intake or exhaust valves associated with each cylinder of the engine. As shown in Figures 3 to 6, by way of an example, the arrangement of the nozzle holder in the air-intake passageway is applicable to cylinders having one exhaust valve 3a with the exhaust passageway 5a only. As shown in Figures 7 and 8 it is also applicable to cylinders having more than two air-intake valves. By way of an example, Figure 7 shows a cylinder head with three intake valves 2, 2' and 2". The injection nozzle is again located where the stream of air travelling through the air-intake passageway 4 divides in order to reach the air-intake valves 2, 2' and 2". Another example is shown in Figure 8 in which the cylinder is provided with four air-intake valves, 2, 2', 2", and 2'''. Again, the injection nozzle is located where the stream of air travelling through the air-intake passageway 4 divides in order to reach the air-intake valves 2, 2', 2", and 2'''.

It will also be understood that the nature of the cooling agent is irrelevant in regard to the applicability of the present invention; particularly, it can be applied both to water cooled and to air cooled internal combustion engines of the fuel injection type.

It will be understood that this invention is susceptible to modification in order to adapt it to different usages and conditions, and, accordingly, it is desired to comprehend such modifications within this invention as may fall within the scope of the appended claims.

What we claim is:

1. In an internal combustion engine having at least one cylinder and a fuel injection nozzle therefor, an air cooling arrangement for cooling said nozzle, said arrangement comprising, in combination, wall means forming an air-intake chamber, said wall means having top and bottom walls, two side walls and a front wall; a pair of spaced valve means which when open place said cylinder in communication with said air-intake chamber through said bottom wall thereof; and a nozzle holder adapted to hold said fuel injection nozzle, said holder being arranged within said air-intake chamber and extending between said top and bottom walls in that plane in which air entering said air-intake chamber divides into two streams which flow through said pair of valve means, respectively, when the latter are open, said holder being spaced from said side and front walls and being formed with substantially flat side surfaces which are substantially coextensive with the streams flowing through said pair of valve means, whereby air passing through said air-intake chamber contacts all outer surfaces of said holder, thereby uniformly cooling the same as well as a fuel injection nozzle held thereby, without the smooth flow of air through said air-intake chamber being impeded by said holder.

2. In an internal combustion engine having at least one cylinder and a fuel injection nozzle therefor, an air cooling arrangement for cooling said nozzle, said arrangement comprising, in combination, wall means forming an air-intake chamber, said wall means having top and bottom walls, two side walls and a front wall; a pair of spaced valve means which when open place said cylinder in communication with said air-intake chamber through said bottom wall thereof; and a tubular nozzle holder jacket adapted to receive a nozzle holder capable of holding said fuel injection nozzle, said jacket being arranged within said air-intake chamber and extending between said top and bottom walls in that plane in which air entering said air-intake chamber divides into two streams which flow through said pair of valve means, respectively, when the latter are open, said jacket being spaced from said side and front walls and being formed with substantially flat side surfaces which are substantially coextensive with the streams flowing through said pair of valve means, whereby air passing through said air-intake chamber contacts all outer surfaces of said jacket, thereby uniformly cooling the same as well as both a nozzle holder located in said jacket and a fuel injection nozzle held by said holder, without the smooth flow of air through said air-intake chamber being impeded by said jacket.

3. An air cooling arrangement as defined in claim 2 wherein said tubular nozzle holder jacket is integral with said top and bottom walls of said wall means.

References Cited in the file of this patent

UNITED STATES PATENTS

| | | |
|---|---|---|
| 2,322,606 | Ward | June 22, 1943 |
| 2,699,358 | Sonderegger | Jan. 11, 1955 |